Patented Apr. 11, 1950

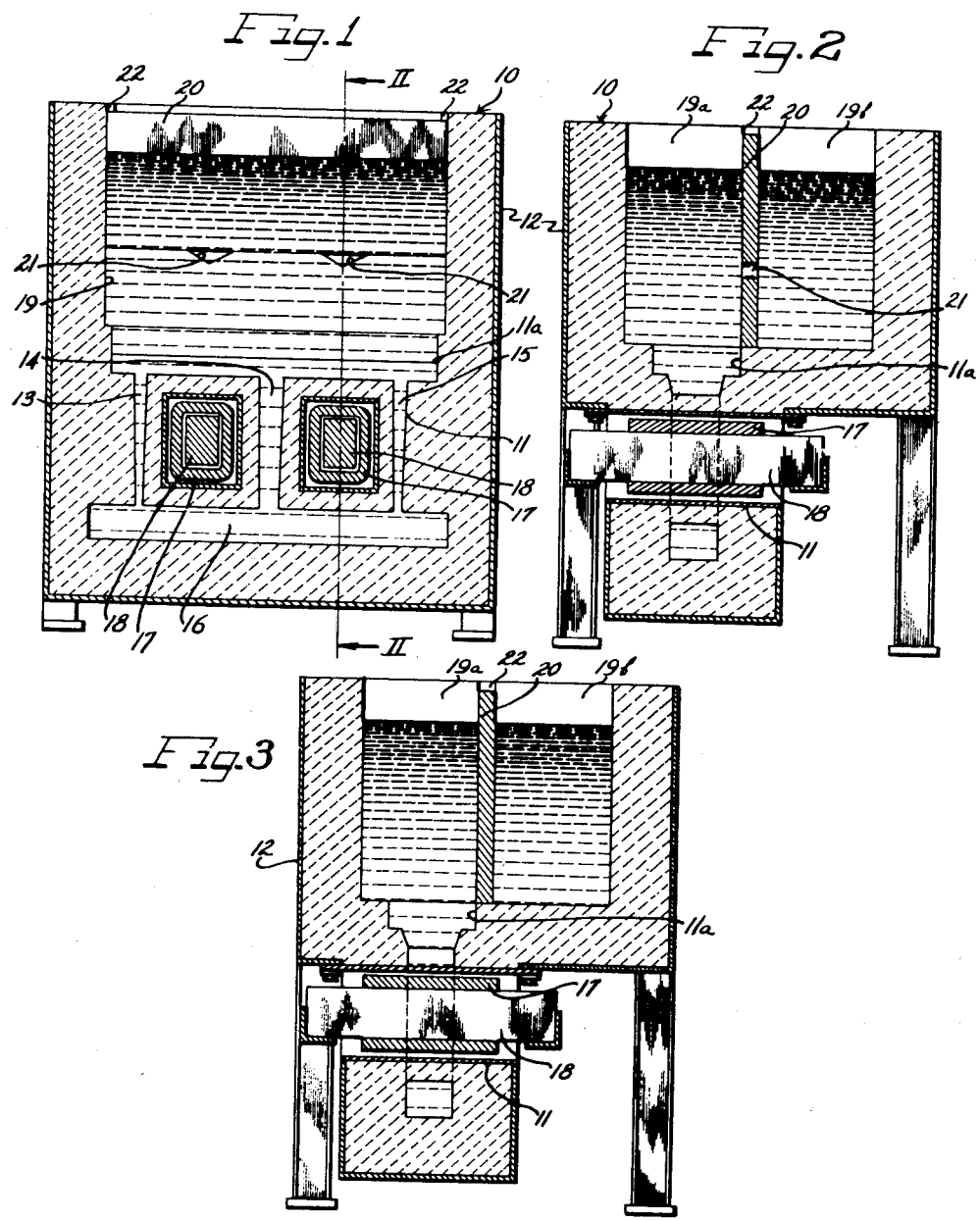

2,503,621

UNITED STATES PATENT OFFICE 2,503,621

INDUCTION FURNACE

Ralph L. Lindner, Cleveland, and Tyler K. Hayes, Cleveland Heights, Ohio, assignors to Thompson Products, Inc., Cleveland, Ohio, a corporation of Ohio Application September 30, 1948, Serial No. 51,922

2 Claims. (Cl. 13—29)

This invention relates to an induction furnace and more particularly deals with a baffled hearth construction for a molten metal holding furnace which minimizes slag or oxide inclusions in the metal.

This invention further includes a method of preserving easily oxidized metals in pure molten form for castings which are relatively free from slag inclusions or so-called "hard spots."

The invention will hereinafter be specifically described in connection with the melting of aluminum and the holding of molten aluminum in a stable condition for casting because this metal is commonly melted in electric induction furnaces and is easily spoiled by slag inclusions. However, it will be understood that the baffled hearth construction of this invention will minimize slag inclusions in any metal melted in the furnace. Aluminum slag and aluminum metal have about the same specific gravity so that the slag does not float off out of the body of molten metal.

A conventional induction furnace generates power within the metal and relatively low temperatures prevail in the hearth above the molten metal. These furnaces are usually provided with a deep bath of substantially small cross-section and can maintain any desired temperature in the bath. Although temperatures throughout a typical bath are usually quite uniform, it is not unusual that slag formations appear in the molten metal due to oxidation of the aluminum. The rate of oxidation and slag formation is materially increased when the metal bubbles freely in the bath and as explained above, the slag will not rise to the surface of the molten metal but remains trapped in the body of the metal.

Heretofore slag inclusions in aluminum castings have been a constant source of trouble and expense inasmuch as these inclusions provide hard spots which have caused breakage of tools during machine finishing operations and have resulted in spoiling of a relatively high number of casting units.

An induction furnace constructed in accordance with our invention provides for the partitioning of the furnace hearth into two distinct compartments, thereby confining agitation of the molten metal to one side of the hearth without sacrificing the heat transfer characteristics of the furnace. This, therefore, constitutes one object of our invention.

Another object of our invention is to provide an induction furnace of the so-called holding type, whereby relatively slag free molten aluminum may be drawn for the purpose of pouring castings.

Another object of our invention is to provide an improved method of melting metal and producing castings relatively free of objectionable slag inclusions.

A further object of our invention is to provide an improved induction furnace for melting metal and maintaining metal in a molten state.

The novel features and characteristics of our invention are set forth in particularity in the appended claims. Our invention, itself, however, both to its organization and method of operation, together with further objects and advantages thereof, may best be understood by reference to the following detailed description and the accompanying drawings, in which Figure 1 is a vertical sectional view of an induction furnace embodying our invention;

Figure 2 is a cross-sectional view taken on line II—II of Figure 1, and

Figure 3 is a view similar to Figure 2, but showing an alternative embodiment of our invention.

On the drawings:

Referring to Figures 1 and 2, an induction furnace suitable for aluminum metal and the like is indicated generally at 10 as comprising a furnace secondary 11 and crucible 12.

The furnace secondary 11 may be constructed in accordance with any form well known in the art and is herein shown as comprising a well-like structure packed with refractory material to define three vertical channels 13, 14 and 15 connected at the bottom by a straight horizontal chamber 16 of larger cross-section. The channels open upwardly into a furnace secondary outlet channel or sump 11a extending across the furnace near one side thereof.

The two loops formed by the center channel 14 in connection with each of the outside channels 13 and 15 and with the corresponding part of the chamber 16 are interlaced with a pair of primary coils indicated at 17 wound around closed cores of laminated steel indicated at 18. The coils 17 are connected to a suitable source of electric current.

The crucible 12, formed in a conventional cubical shape, is packed with refractory material to define a bath or hearth 19 located at the top of the sump 11a and channels 13, 14 and 15.

A baffle partition 20 is inserted into the hearth 19 adjacent to and parallel with the outlet channel or sump 11a thereby effectively partitioning the hearth 19 into two compartments designated on the drawings as 19a and 19b. The partition 20 is preferably made of a material having high heat conductivity properties such as silicon carbide or the like and may be formed of two rectangular plates, one plate being cut on its abutting edge to define a plurality of unimpeded triangular-shaped openings 21 (Figures 1 and 2) below the level of the molten metal. The partition 20 may also be formed of a single solid rectangular plate as shown in Figure 3. The plates 20 can conveniently fit into vertical grooves 22 in the refractory lining of the hearth 19 to be retained in upright position.

A perforated partition, as shown in Figures 1 and 2 allows the agitated bubbling metal emanating from the outlet channel 11a to be confined in compartment 19a and permits the molten metal in compartment 19b to remain quiet. All metal for casting is then ladled and poured from the quiet side 19b of the pot 19. Charges and ladle dregs are placed in compartment 19a.

The openings 21 permit greater heat conductivity from one side of the hearth to the other and also permit the molten metal to flow from the compartment 19a into the compartment 19b. However, in accordance with Newton's law of gravitation any slag particles formed in the agitated metal contained in compartment 19a will not flow through the holes 21 due to the presence and gravitational influence of the baffle partition 20. Thus, slag particles will be attracted towards the partition 20 away from the openings 21 in the partition and will ultimately flow to the sides of the compartment. This is, of course, highly desirable since the molten metal in the compartment 19b is kept relatively free of bothersome slag formations and castings may then be produced free of slag inclusions.

A solid hearth partition, as shown in Figure 3, accomplishes a complete physical isolation of the agitated molten metal emanating from the secondary 11 from the metal contained in the quiet side 19b, yet the partition 20 passes a sufficient quantity of heat to keep the molten metal at a suitable temperature for pouring. Metal for casting, therefore, may be ladled and poured from the compartment 19b and the supply may be renewed with a fresh charge of molten metal from time to time as may be necessary.

It will be apparent to those skilled in the art that we have described an improved induction furnace which not only raises and maintains molten metal at correct pouring temperatures, but facilitates the production of improved castings relatively free of slag inclusions.

While we have shown a particular embodiment of our invention, it will, of course, be understood that we do not wish to be limited thereto since modifications of certain details may be made without departing from the spirit of our invention. We desire to be limited, therefore, only by the scope of the appended claims and the prior art.

We claim as our invention:

1. In an induction furnace having a furnace secondary sump for heating molten metal by electromagnetic induction and having a crucible above said sump, said crucible having an upright partition wall of high thermal conductivity extending across the crucible in continuous contact with the side walls and bottom thereof, and dividing the crucible, said crucible having separate compartments on opposite sides of said partition, one of said compartments being separated from said sump, the other of said compartments being above said sump, said partition having an opening therein of small cross-sectional area relative to the upright wall area of the partition and lying substantially below the top of and substantially above the bottom of the partition, and said opening being sufficiently large to accommodate low velocity flow from the compartment above the sump to the compartment separated from the sump whereby molten metal can flow through the opening but slag inclusions will tend to remain in the compartment above the sump.

2. In an induction furnace having a furnace secondary sump for heating molten metal by electromagnetic induction and having a crucible above said sump, said crucible having an upright partition wall of high thermal conductivity extending across the crucible in continuous contact with the side walls and bottom thereof, and dividing the crucible, said crucible having separate compartments on opposite sides of said partition, one of said compartments being separated from said sump, the other of said compartments being above said sump, said partition having a plurality of triangular shaped openings therein, each of said triangular shaped openings having a small cross-sectional area relative to the upright wall area of the partition and lying substantially below the top and substantially above the bottom of the partition, said triangular shaped openings being sufficiently large to accommodate low velocity flow from the compartment above the sump to the compartment separated from the sump whereby molten metal can flow through the triangular shaped openings but slag inclusions will tend to remain in the compartment above the sump.

RALPH L. LINDNER.
TYLER K. HAYES.

REFERENCES CITED

The following references are of record in the file of this patent:

UNITED STATES PATENTS

| Number | Name | Date |
|---|---|---|
| 859,134 | Snyder | July 2, 1907 |
| 859,137 | Snyder | July 2, 1907 |
| 1,061,433 | Wicker | May 13, 1913 |
| 1,226,651 | Fort | May 22, 1917 |
| 1,737,566 | Brown | Dec. 3, 1929 |
| 1,763,881 | Brace | July 1, 1930 |
| 1,878,532 | Northrup | Sept. 20, 1932 |
| 2,195,071 | Bahney et al. | Mar. 26, 1940 |
| 2,250,155 | Ferguson | July 22, 1941 |
| 2,368,173 | Tama et al. | Jan. 30, 1945 |

FOREIGN PATENTS

| Number | Country | Date |
|---|---|---|
| 3,291 of 1914 | Great Britain | Feb. 7, 1914 |
| 880,749 | France | Jan. 11, 1943 |

OTHER REFERENCES

Wilcox: Electric Heating, 1st edition, 1928, McGraw-Hill Book Company, Inc.